(12) United States Patent
Den Hollander et al.

(10) Patent No.: US 8,059,514 B2
(45) Date of Patent: Nov. 15, 2011

(54) OPTICAL DISC COMPRISING A WATERMARK AND A METHOD AND RECORDER FOR RECORDING SUCH A DISC

(75) Inventors: Jacobus Maarten Den Hollander, Eindhoven (NL); Josephus Arnoldus Henricus Maria Kahlman, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 12/674,446

(22) PCT Filed: Aug. 22, 2008

(86) PCT No.: PCT/IB2008/053376
§ 371 (c)(1),
(2), (4) Date: Feb. 22, 2010

(87) PCT Pub. No.: WO2009/027913
PCT Pub. Date: Mar. 5, 2009

(65) Prior Publication Data
US 2010/0142349 A1 Jun. 10, 2010

(30) Foreign Application Priority Data
Aug. 31, 2007 (EP) .................................. 07115428

(51) Int. Cl.
*G11B 7/00* (2006.01)

(52) U.S. Cl. .............. 369/109.02; 369/275.3; 369/275.4
(58) Field of Classification Search .................. None
See application file for complete search history.

(56) References Cited

U.S. PATENT DOCUMENTS

| 5,608,717 | A | 3/1997 | Ito et al. |
| 5,608,718 | A | 3/1997 | Schiewe |
| 5,875,170 | A | 2/1999 | Tompkin et al. |
| 6,496,541 | B1 | 12/2002 | Kahlman et al. |
| 2002/0076046 | A1 | 6/2002 | Heylen |
| 2003/0172276 | A1 | 9/2003 | Yntema et al. |
| 2008/0151718 | A1* | 6/2008 | Ando et al. ............. 369/53.17 |

FOREIGN PATENT DOCUMENTS

| EP | 1603132 A2 | 12/2005 |
| WO | 9600446 A1 | 1/1996 |
| WO | 0241316 A1 | 5/2002 |
| WO | 2005086157 A1 | 9/2005 |
| WO | 2007145626 A1 | 12/2007 |
| WO | 2008078234 A1 | 7/2008 |

* cited by examiner

*Primary Examiner* — Paul Huber

(57) ABSTRACT

A visible pattern is obtained by modulating the digital sum value. Because the digital sum value modulation allows the choice of several different channel bits groups between DC control points, the selection of a group of channel bits resulting in a change of reflection. This creation of a visible pattern is highly suitable for Blueray as the parity preserving property of the channel code guarantees disparity inversion by the DC-control bit, which keeps the DSV excursions between hard limits. As a result only small DSV deliberate variations are required to produce a grating, which will not deteriorate the bit-detection margin of the optical disc.

16 Claims, 9 Drawing Sheets

OPTICAL DISC COMPRISING A WATERMARK AND A METHOD AND RECORDER FOR RECORDING SUCH A DISC

This application is a 371 of PCT/IB08/53376, filed Aug. 22, 2008.

FIELD OF THE INVENTION

The invention relates to an optical disc comprising
a track,
a plurality of marks located in the track representing channel bits,
the plurality of channel bits having a Digital Sum Value,
the Digital Sum Value having a set point determined by a DC control,
the DC control being limited within a DC Control range

BACKGROUND OF THE INVENTION

Such a disc is known from U6496541 where a channel code for recording an optical disc is disclosed. This 17PP channel code is parity preserving. To create watermarks on the optical disc such a code is extended with extra code words so that when encoding a choice exists between code words that yield higher or lower reflectivity. This is however not always possible if most code words are already used by the code and not many additional unused code words are available, so that the result is of low quality because not always the optimal reflectivity can be obtained. In addition adding extra code words to the code means that the decoder has to be modified in order to correctly decode these additional code words, resulting in a loss of backwards compatibility with the installed base.

The visual pattern is a form of watermark allowing the inspection of the disc to determine whether it is a genuine disc or not.

Watermarking and other copy protection measures are taken to stop home copying and professional pirates.

SUMMARY OF THE INVENTION

The known record carriers with such a watermark also have the problem that these discs can be duplicated by professional Laser Beam Recorders (LBR's). An LBR is a professional mastering machine for optical discs. The duplication of a record carrier with the known watermarks using such a Laser Beam Recorder is difficult to distinguish from the original record carrier.

It is an objective of the present invention to provide a record carrier with a detectable pattern that cannot be easily copied.

To achieve this objective the optical record carrier according to the invention is
characterized in that the optical disc further comprises:
diffractive elements in a limited contiguous area,
a diffractive structure formed by the diffractive elements, each diffractive element being formed by an alignment of a plurality of marks across a plurality of radially at least partially adjacent sections of the track, where the set point is a modulated set point, diverting from a default set point in the limited contiguous area, the modulated set point being correlated to the alignment of the plurality of marks across the plurality of radially adjacent sections of the track.

A diffractive structure is obtained by modulating the set point of the digital sum value. Because the DC control aims to keep the digital sum value as close as possible to the set point through the choice between possible groups of channel words, the modulation of the set point allows this choice of several different channel bits groups between DC control points to be influenced, the selection of a group of channel bits resulting in a repositioning of the marks in the track representing the channel bits. Within the constraints of the channel code a selection can be made between at least two or more groups of channel bits and thus between patterns of marks. By temporarily changing the set point through modulation another choice can be made than the choice otherwise made by the DC control when attempting to bring the digital sum value closer to the default set point. Thus, instead of aiming to bring the digital sum value closer to the default set point, the DC control loop is presented with a modulated set point and the DC control will aim to bring the digital sum value closer to that modulated set point by selecting the best group of channel bits from the available choices of groups of channel bits. The modulation of the set point and the subsequent selection of the best group of channel bits allows the alignment of marks in radially adjacent sections of the track. Radially adjacent sections of the track are those sections that are adjacent but located on different windings of the track.

By aligning the marks across radially adjacent sections of the track, the diffractive elements of a diffractive structure are formed. Such a diffractive structure has particular characteristics that can easily be detected, yet minute differences introduced by a copy process destroy or disturb the diffractive structure. Hence the presence of an intact diffractive structure indicates that the optical disc is an original optical disc, whereas the weakening or absence of the diffractive structure indicated that the optical disc is copied optical disc. The legality of the optical disc can thus be determined.

It should be noted that the present invention of course also works when the area outside the limited contiguous area is modulated as well, but in a different fashion, for instance uncorrelated or small amplitude, hence creating a contrast between the limited contiguous area and the outside area.

A visual watermark is used in e.g. DVD discs to store content information onto the disc in a visual format by modulating the digital sum value by using freedom in the channel code rules.

This creation of a visible pattern is highly suitable for Blueray disc as the parity preserving property of the channel code guarantees disparity inversion by the DC-control bit, which keeps the DSV excursions between hard limits. As a result only small DSV deliberate variations, through modulation of the set point, are required to produce a visual watermark, which will not deteriorate the bit-detection margin of the optical disc.

It should be noted that although the description often refers to the channel coding used in Blueray, other channel codes comprising DC control means, such as EFM+, are also suitable for application of the present invention. In EFM+ the standard DC control also influences the choice of codewords to minimize the DC content of the channel bits produced, and by manipulating this choice visible patterns are obtained.

In an embodiment of the optical disc the diffractive structure is a grating.

A grating is an optical structure which can be made on the record carrier using the invention. A grating has a diffractive effect on light projected on the grating, either in a reflective fashion or in a transmissive fashion, which can easily be detected.

A grating is formed by the alignment of elements where the elements of the grating are formed by the alignment of marks. Circular, oval or linear alignment of the marks allows the formation of a grating.

In a further embodiment of the optical disc the diffractive elements extend perpendicular to a direction of the track.

By positioning the diffractive elements so that they extend perpendicular to the direction of the track the distance between the diffractive elements can finely be controlled, whereas this control is not possible when the diffractive elements would extend along the track since in that case the track spacing presents a lower barrier for the spacing of the marks and also introduces a discrete step in the spacing of the diffractive elements.

In a further embodiment of the optical disc the diffractive elements have a size such that a shift in a position of the marks smaller than the size of the diffractive elements results in loss of the diffractive structure.

By making the diffractive elements as thin as possible, a shift of the marks forming the diffractive element of the same magnitude but smaller than the width of the diffractive element reduces the diffractive characteristics. The edges of the diffractive elements are frilled because of the shift of marks or the distance between two diffractive elements is altered by the shift. Both effects caused by the shift reduce the diffractive characteristics of the diffractive structure overall. This means that a small amount of shift of the marks relative to each other can easily be detected through the loss of the diffractive characteristics of the diffractive structure.

In a further embodiment of the optical disc the diffractive structure is dimensioned to cause diffraction of a beam of light with a visual wavelength. The design of the diffractive structure so that it allows the detection of the presence of the diffractive structure by a visual wavelength facilitates the detection by the human eye without additional tools for converting wavelength.

In a further embodiment of the optical disc the visual wavelength is the optical disc recording or readout wavelength.

By using the wavelength of the recording or playback mode of the optical disc the refractive structure can be detected by the recording or playback device and visual detection by a person using a light source containing a laser as used by such a recording or playback device is possible. The grating can be optimized for a specific wavelength as used by the recording or playback device and that wavelength can easily be obtained by using the readily available laser from the recording or playback devices.

In a further embodiment of the optical disc the diffractive structure forms a visual mark on the optical disc when illuminated.

The diffractive structure can be given a shape on a macro scale that is easily recognized and is more difficult for forgers to recreate, thus providing another authenticity mark. Further more shifts of the refractive elements result in the loss of the diffractive effect in the visual mark, causing the visual mark to blend with the rest of the surrounding area. Shifts of the refractive elements can also result in distortions of the visual mark.

In a further embodiment of the optical disc the visual mark is a logo. Using the invention for creating a logo on an optical disc allows easy identification of the owner of the authenticity mark since the logo is coupled to the owner.

A method of inspecting an optical disc to find illegally copied optical discs comprises the steps of:
locating a diffractive structure on the optical disc,
illuminating, when found, the diffractive structure,
observing a diffractive characteristic of the diffractive structure,
declaring the optical disc an illegally copied optical disc when no diffractive nature of the diffractive structure is observed.

Using this method one can establish whether a disc is an original with an intact diffractive structure on the optical disc, or a forgery i.e. illegally duplicated optical disc with a damaged diffractive structure with lost or reduced diffractive characteristics. The diffractive The WM can only be tampered by means of bit-by-bit-copy using locked disc-rotation-motors. This however will produce a lower-quality copy as disc-errors are copied too. When data is re-encoded, the required DSV set point is extremely difficult to retrieve as it depends on the user-data, data-location and the DSV history of the channel bits. As a result the refractive structure pattern cannot be reproduce anymore.

Summarizing the invention has the following advantages:
1. Applicable to any optical disc standard
2. Diffractive structures can be included on the optical disc
3. No format change required The diffractive structure in effect functions as a water mark and may also contain additional information concerning master-number, manufacturer, or hidden messages encoded as a waveform or amplitude variations in the DSV modulation. These data may be detected as DC-variations in the detected signal, by e.g. a "fast-slicer" (observing transitions in the PLL to suppress channel code noise) or a simple feedback-slicer.

Furthermore, excessive fast DSV variations cannot be followed by the detection circuitry and will introduce extra jitter (bit-errors). Hence it is wise to limit the amplitude and bandwidth used to create the diffractive structure.

BRIEF DESCRIPTION OF THE FIGURES

The invention will now be discussed based on figures.

DETAILED DESCRIPTION OF THE EMBODIMENTS

Figure 1:
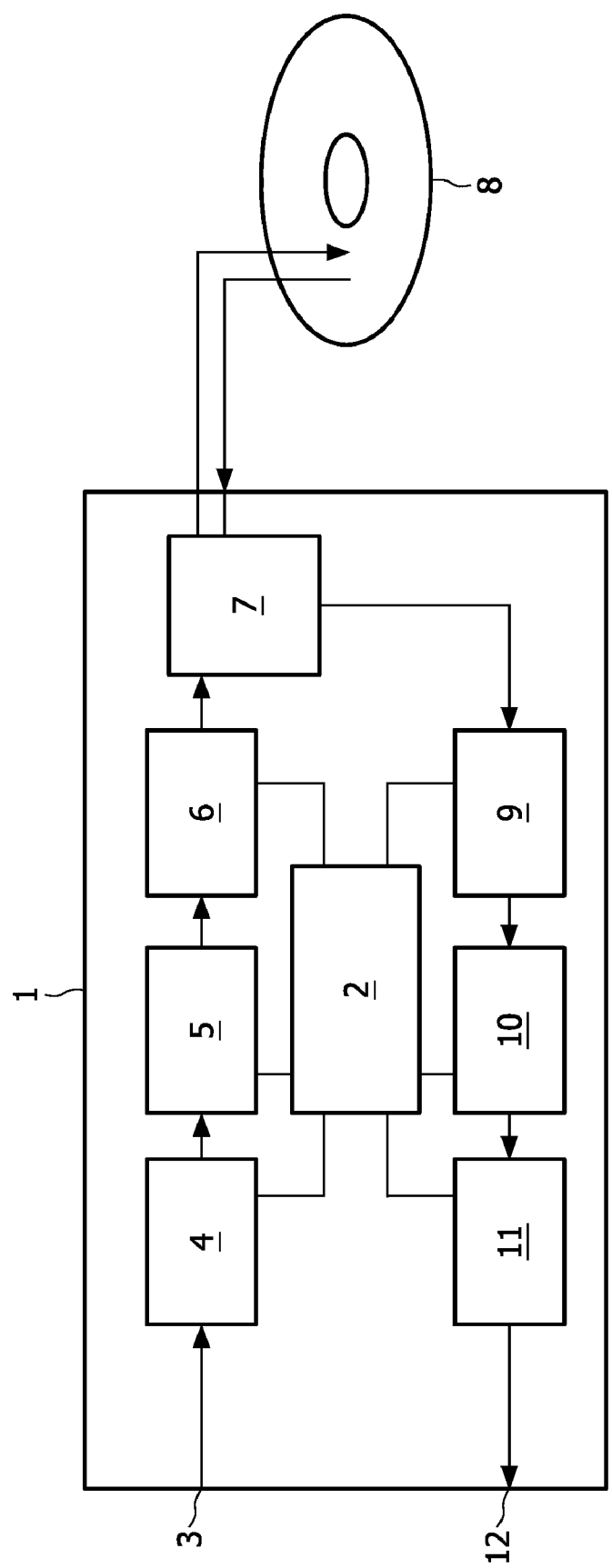
FIG. 1 shows a block diagram of a recording device.

FIG. 1 shows a block diagram of a recording device.
The recording device 1 is arranged for recording user data received on input 3 on the optical record carrier 8. For this, the recording device 1 comprises a data formatter 4. The data formatter 4 receives the user data from the input 3 and determines in what format the user data must be recorded on the optical disc 8. The resulting formatted data is provided by the data formatter 4 to the error correction encoder 5 that applies an error correction code to the data received from the data formatter 4. This error correction encoded data is subsequently provided by the error correction coder 5 to the channel coder 6. The channel coder 6 applies a channel code to the error correction encoded data so that the error correction encoded data is more suitable to be recorded on the optical disc 8. The channel encoder 6 for instance applies a run length limited code with constraints to the error correction encoded data. Another more specific example is the 17PP parity preserving channel code which is often used by channel coders in recording devices for optical discs.

The result of the channel encoder 6 are groups of channel bits which are provided by the channel encoder 6 to the front end 7 where, when in recording mode, the groups of channel bits are converted into a modulated laser beam for recording the marks on the optical disc corresponding to the groups of channel bits as provided by the channel encoder 6. The front end 7 comprises the optical light path that may comprise polarisation means, deflection means, filter means etc.

The end result is an optical disc 8 with channel bits recorded in a track on the optical disc.

Another part of the typical recording device 1 is the playback section 9,10,11,12. When reading marks from the optical disc 8, in reading mode, the front end 7 converts the mark/land pattern into groups of channel bits and provides these groups of channel bits to the channel decoder 9. The channel decoder 9 performs the inverse function of the channel encoder 6 and thus removes the channel code, resulting in error correction encoded data. The channel decoder 9 provides the error correction encoded data, as decoded from the groups of channel bits, to the error correct decoder 10. The error correction decoder 10 performs the error correction decoding on the error correction encoded data and detects/corrects any errors if present and if possible to detect/correct. The output of the error correction decoder is the formatted data which is provided to the data deformatter 11. The data deformatter 11 removes the format from the formatted data and provides the resulting user data to the output 12 of the recording device.

Figure 2:
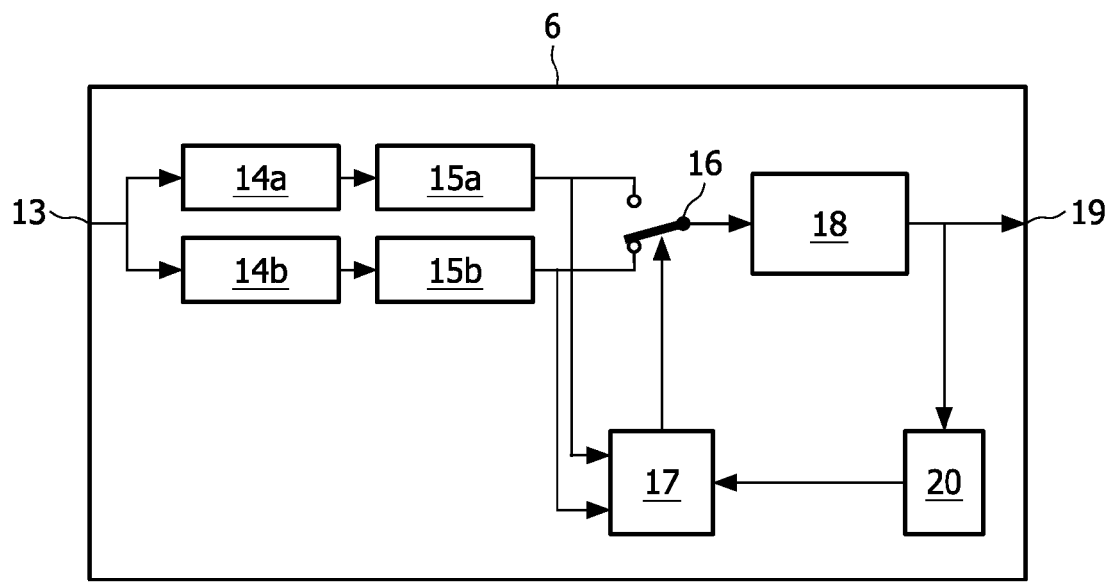
FIG. 2 shows an encoder as commonly used in the recording device.

FIG. 2 shows a channel encoder as commonly used in the recording device.

To explain the invention a 17PP channel encoder 6 with DC control is first explained as it is known in the art and used in Blueray Disc recorders.

The 17PP channel encoder comprises an input 13 on which the error correction coded data is received as explained in FIG. 1. This data is provided to a first 17PP coder 14a and a second 17PP coder 14b. A '0' bit is inserted in the front of a group of bits resulting in a first concatenated group of bits and the first 17PP coder encodes this first concatenated group of bits. This results in a first group of 17PP encoded bits.

In parallel a '1' bit is inserted in the front of the group of bits resulting in a second concatenated group of bits and the second 17PP coder encodes this second concatenated group of bits. This results in a second group of 17PP encoded bits.

Both the first group of 17PP encoded bits and the second group of 17PP encoded bits are provided to a DC control unit 17. It is the task of this DC control unit 17 to minimize the DC content, also known as Running Digital Sum or Digital Sum Value of the channel bits as provided to the front end 7 for recording. This minimization of the DC content is beneficial for the recording and retrieval of the channel bits.

In order to minimize the DC content the DC control unit 17 can operate a switch and thus select either the first group of 17PP encoded bits or the second group of 17PP encoded bits. The DC control unit 17 selects one of these groups to be sent to the 1T precoder 18 and thus subsequently to the output 19 of the channel encoder 6.

In order to determine the Digital Sum Value, i.e. DC content, of the groups of 17PP encoded channel bits, the output of the 1T precoder is integrated by the integrator 20 and the result of the integration is provided to the DC control unit 17.

It is the goal of the DC control unit 17 to keep the Digital Sum Value DSV as close to zero (or another constant value) as possible in order to ensure as low a DC content in the recorded channel bits as possible.

The servo loops in the front end 7 of the recorder or a playback device operate better when the recovered channel bits have minimal DC content. Also the bit detection in a read mode is improved with low DC content.

Figure 3:
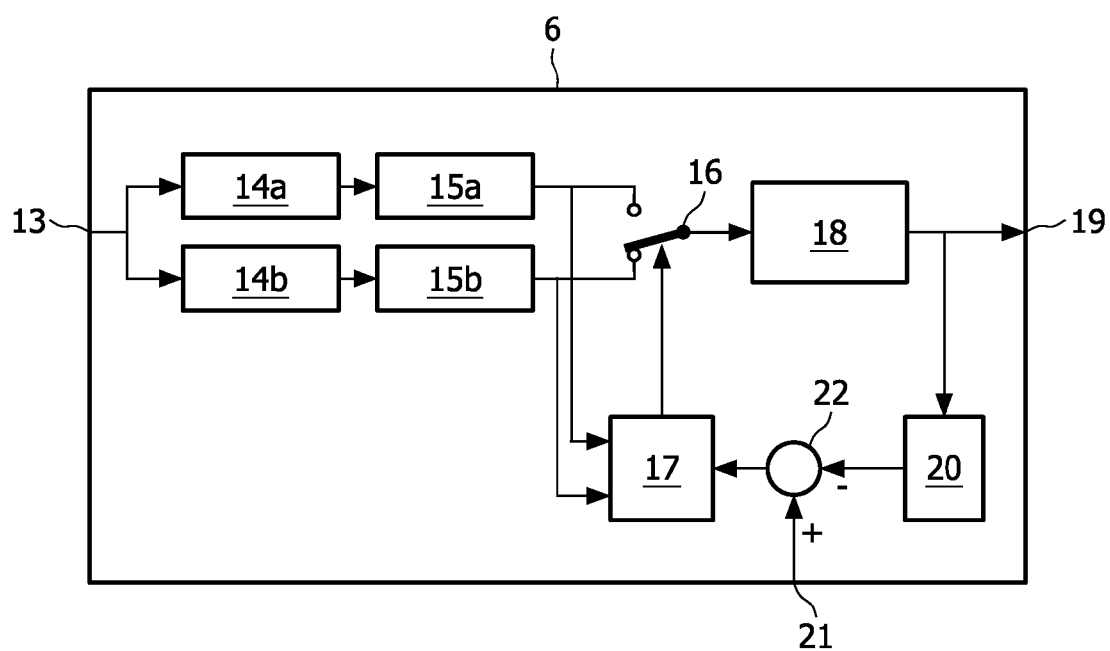
FIG. 3 shows an encoder of the recording device according the invention.

FIG. 3 shows an encoder of the recording device according the invention.

Previously the creation of visible patterns on the optical disc was achieved by modifying the actual channel code, resulting in compatibility problems and reduced channel code performance. The invention avoids this by leaving the 17PP encoding untouched. Therefore the decoding of this untouched 17PP channel code is also not affected, thus guaranteeing compatibility of the optical disc according to the present invention with the existing installed playback devices.

Instead of modifying the channel code itself, the DC control is modified. The advantage of this is that, when properly done, the servo loops and bit detection during read-out of the data is not affected, yet significant changes in reflectivity can be achieved and effectively controlled.

For this the channel encoder 6 is modified by adding a summation device 22 (or any other device affecting the output of the integrator 20 in a controlled way) between the integrator 20 and the DC control unit 17. To the output of the integrator 20 a value is added as provided to the new water mark input 21 of the channel encoder 6.

While the integrator 20 is operating normally and, let's say is actually outputting a DSV of 0, the DC control unit 17 will receive a value different from 0 when the watermark input 21 is provided with a value. For example when the watermark input 21 is provided with a value of +3, the integrator is providing the summation device 22 with a value of '0', the DC control unit 17 will receive the value '3' and thus starts selecting a different group of 17PP encoded bits in an attempt to reduce the received value of '3' to '0'. Once the DC control unit has achieved this goal, the effective DSV of the outgoing channel bits will be '−3'. The value received at the watermark input 21 thus effectively changes the set point of the original system ('0') to the negative of whatever value is provided to the watermark input. In the example above the set point is changed to '−3'. Obviously, by changing the polarities of the summation device 22, the polarities of the translation from input value to set point value can be changed.

It was found for instance that an increase in the set point results, in the experimental system, resulted in an area with lower reflectivity, thus appearing darker to the eye when several adjacent tracks were treated in that way.

Figure 4:
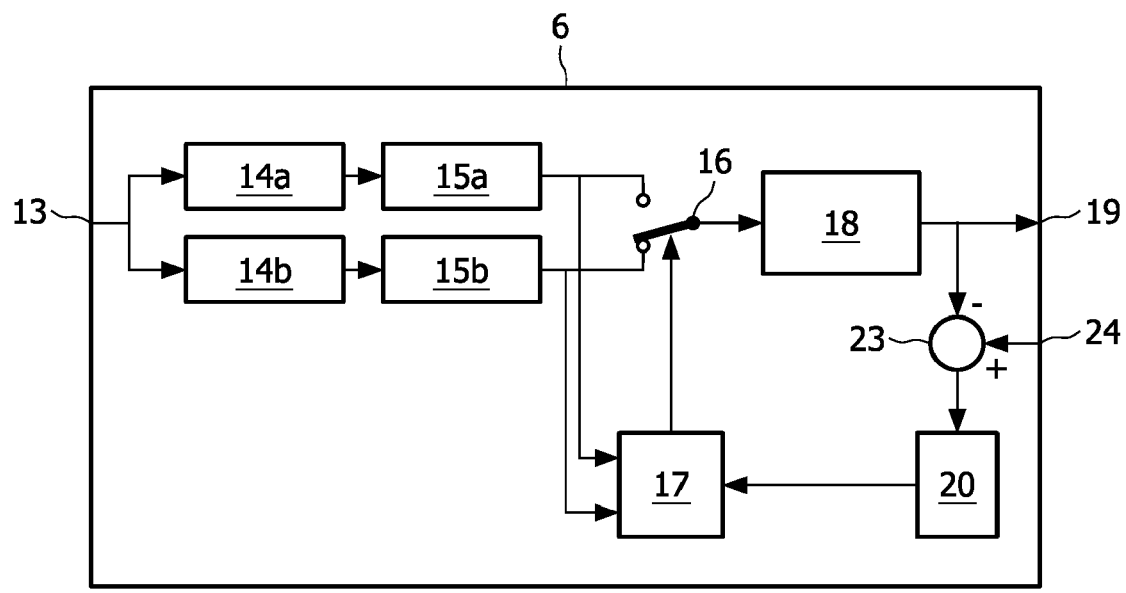
FIG. 4 shows another embodiment of an encoder of the recording device according the invention.

FIG. 4 shows another embodiment of an encoder of the recording device according the invention.

An alternative to a summation device 22 between the integrator 20 and the DC control unit 17 is a summation device 23 (or again any other device affecting the input of the integrator 20 in a controlled way) inserted between the output of the 1T precoder 18 and the input of the integrator 20. This summations device 23 also is coupled to the watermark input 24 of the channel encoder 6.

When a value is presented to the watermark input 24, this value is added to the disparity of the channel bits. After integration by the integrator 20 the DC control unit 17 is consequently provided with a higher value (when the value on the watermark input 24 is positive), and the DC control unit will start, just like explained in FIG. 3, selecting different groups of 17PP encoded bits. It should also be noted that when the watermark value on the watermark input 24 is provided for a longer time, the watermark value will be integrated as well, so a constant value will lead to a higher and higher deviation of the DSV. An alternating input (alternating in polarity) will keep the long time average of the DSV constant.

Figure 5:
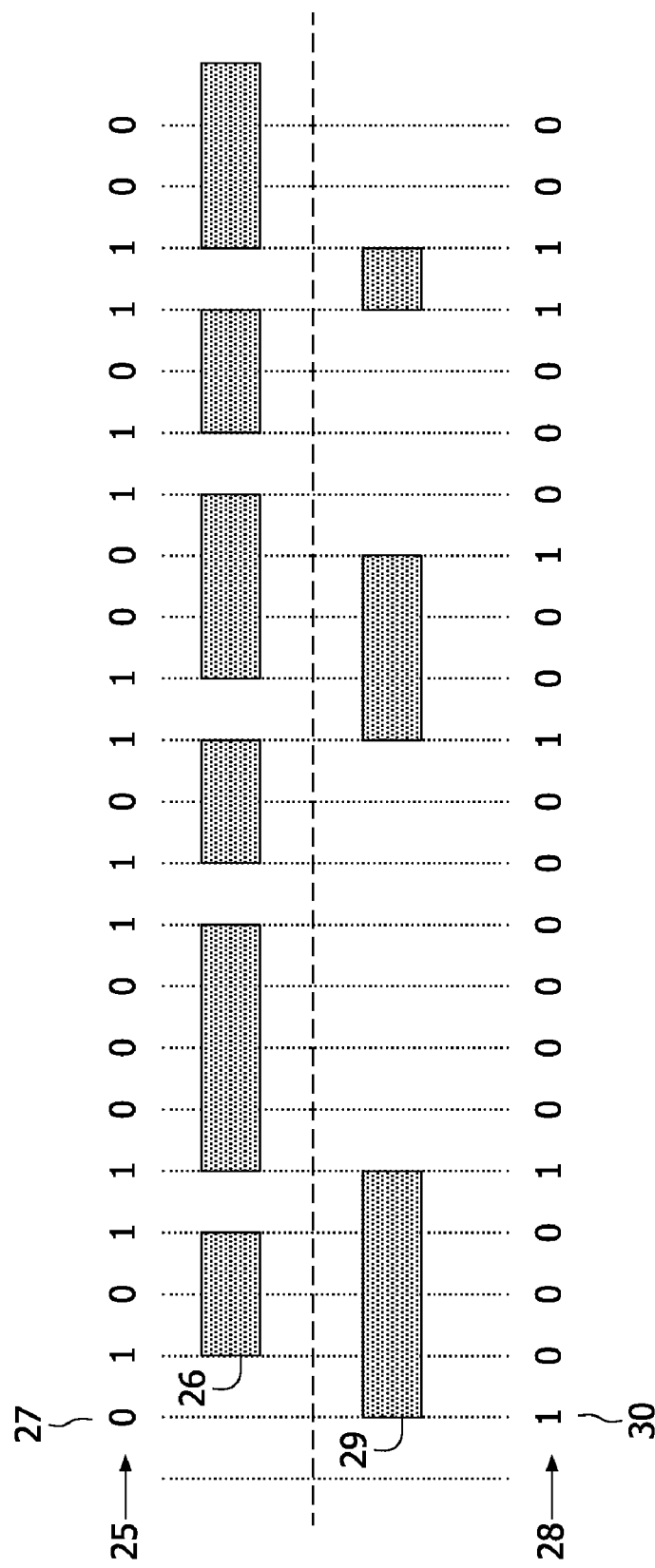
FIG. 5 shows a comparison between two groups of channel bits.

FIG. 5 shows a comparison between two groups of channel bits. Referring back to the description of FIG. 2, a first group of 17PP encoded channel bits 25 and a second group of 17 PP encoded channel bits 28 were generated. In FIG. 5 such a first group of channel bits 25 is shown together with their corresponding first group of marks and lands 26 on the optical disc. As can be seen, the marks are interrupted by lands but there are many marks, thus reducing the reflectivity and rendering the optical disc darker in this area, especially if this treatment is provided to several adjacent tracks.

In FIG. 5 such a second group of channel bits 28 is also shown together with their corresponding second group of marks and lands 29 on the optical disc. As can be seen, the marks are interrupted by lands but there are fewer marks, thus increasing the reflectivity and rendering the optical disc lighter in this area compared to the first group of 17PP encoded bits, and again, especially if this treatment is provided to several adjacent tracks and aims to align the gaps and the land areas as much as possible as will be explained in the following figures.

Figure 6:
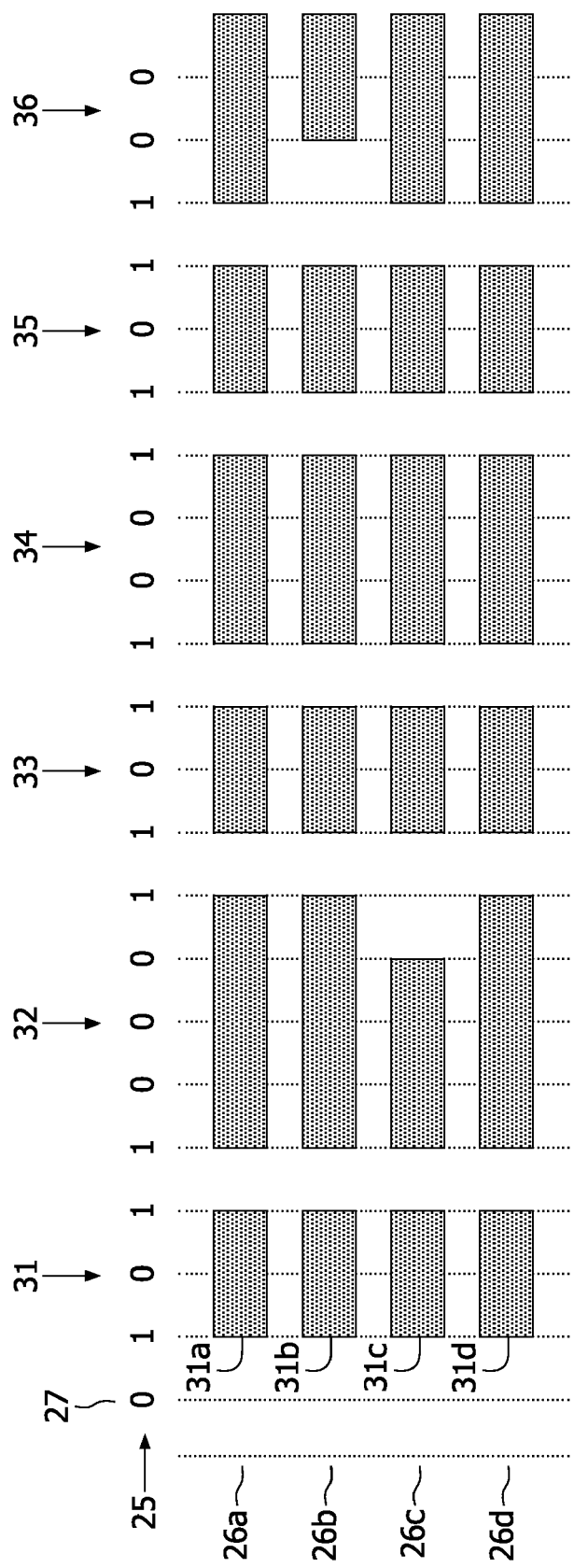
FIG. 6 shows a section of an optical disc with channel bits aligned in neighbouring tracks to obtain a grating.

FIG. 6 shows a section of an optical disc with channel bits aligned in neighbouring tracks to obtain a grating.

The pattern of marks and lands on each radially adjacent section of the track is kept identical to the first group of marks and lands 26 of FIG. 5. Thus on the four radially adjacent sections of the track 26a, 26b 26c 26d the same pattern is used. It should be noted that having identical patterns on adjacent tracks is not required as will be shown later on. Variation as shown in the two sections 26b and 26c as a reduced mark size that leave the principle of diffractive structure intact by maintaining most of the alignment of the marks can be tolerated. The diffractive elements maintain their function.

As can be seen there are relatively many marks and the reflectivity of this section of the disc is relatively low, resulting in a relatively dark area on the optical disk. The adjacent marks 31a, 31b, 31c, 31d form a diffractive element 31, and as can be seen in FIG. 6 in this case extend perpendicular to the direction of the tracks.

The other diffractive elements 32, 33, 34, 35, 36 together with the first diffractive element 31 form a diffractive structure. In this particular case the diffractive structure is a grating but other alignments of the diffractive elements allows the creation of other diffractive structures than just gratings. The grating shown in FIG. 6 is a grating with low reflectivity/transmitivity.

Figure 7:
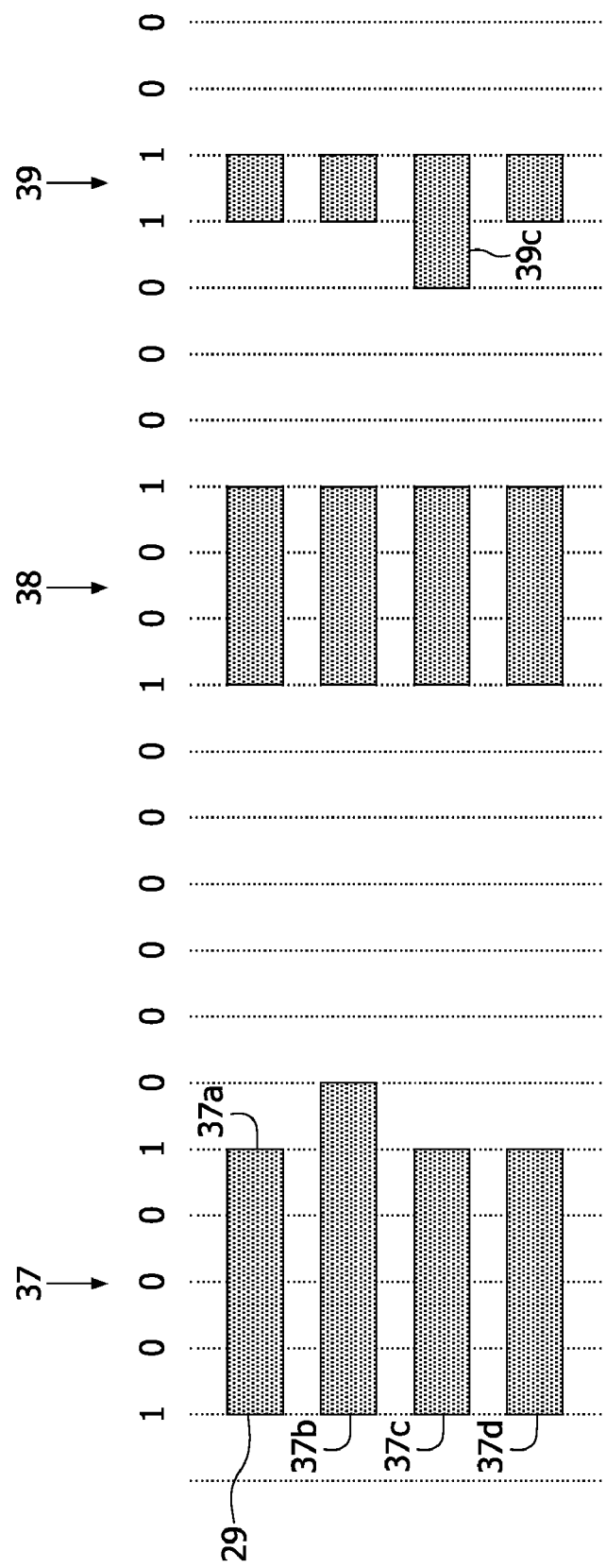
FIG. 7 shows a another section of an optical disc with channel bits aligned in neighbouring tracks to obtain a grating.

FIG. 7 shows another section of an optical disc with channel bits aligned in neighbouring tracks to obtain a grating.

The pattern of marks and lands is kept identical to the second group of marks and lands 29 of FIG. 5. It should be noted that having identical patterns on adjacent tracks is not required as will be shown later on. Small variation such as in mark 31b and 39c that leave the principle of diffractive structure intact can be tolerated as long as the diffractive elements maintain their function.

As can be seen there are relatively many marks and the reflectivity of this section of the disc is relatively low, resulting in a relatively dark area on the optical disk. The adjacent marks 37a, 37b, 37c, 37d form a diffractive element 37, and as can be seen in FIG. 6 in this case extend perpendicular to the direction of the tracks.

The other diffractive elements 38, 39 together with the first diffractive element 37 form a diffractive structure. In this particular case the diffractive structure is a grating but other alignments of the diffractive elements allows the creation of other diffractive structures than just gratings. The grating shown in FIG. 6 is a grating with high reflectivity/transmitivity.

The variations in reflectivity/transmitivity that can be obtained this way allow extra features to be added to the diffractive structure by not only providing it with diffractive properties but also with reflectivity transmitivity changes allowing the detection of the area where the diffractive structure is located without the use of the corresponding light source. This means that when inspecting the optical disc, not the entire disc has to be scanned using the light source with the correct wavelength but that the area for inspection can be narrowed down using the reflectivity/transmitivity changes.

Figure 8:
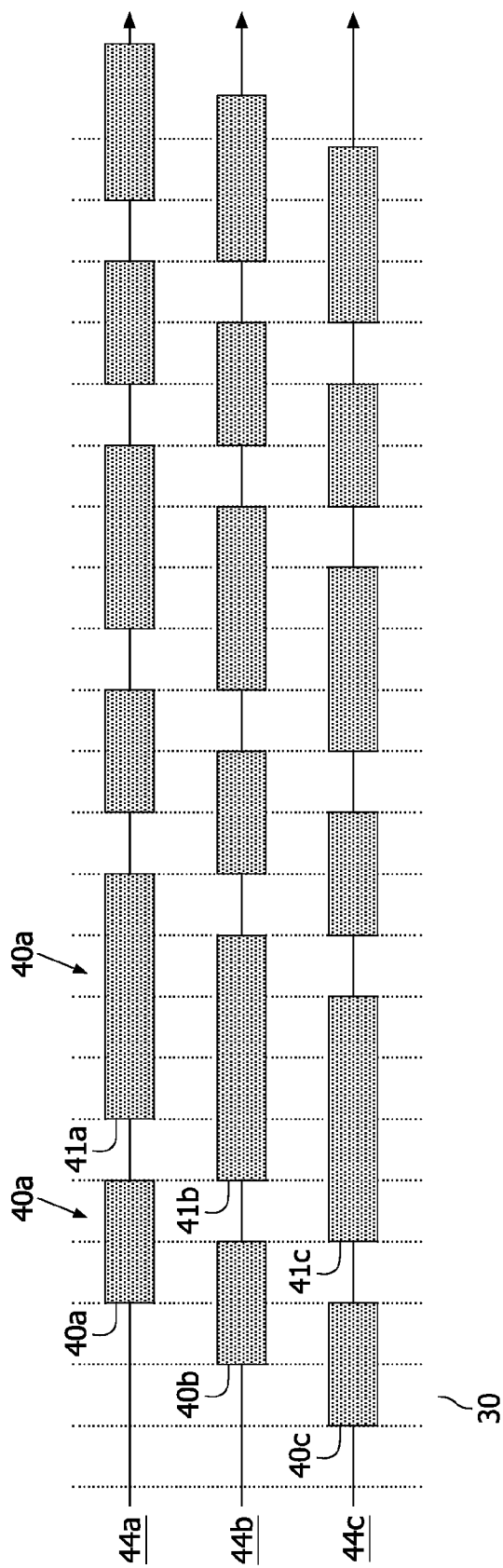
FIG. 8 shows a section of an optical disc with an intermediate reflectivity.

FIG. 8 shows a section of an optical disc with a partly aligned grating.

FIG. 8 shows a section of an optical disc with a diffractive structure where the elements are not perpendicular to the direction of the track.

A diffractive structure can also have diffractive elements that are not straight lines and are not perpendicular to the track. FIG. 8 shows an example where the diffractive elements 40, 41, 42, 43 are not perpendicular to the track.

As shown, each diffractive element 40, 41 is being formed by an alignment of a plurality of marks 40a, 40b, 40c, 41a, 41b, 41c, across a plurality of radially at least partially adjacent sections 44a, 44b, 44c of the track.

As long as the sections 44a, 44b, 44c are at least partially adjacent a continuous diffractive element can be created. When the sections 44a, 44b, 44c are no longer partially adjacent, shifts in the position of the marks due to illegal duplication would not reduce the diffractive characteristics of diffractive structure as effectively as when the sections 44a, 44b, 44c are at least partially adjacent.

Figure 9:
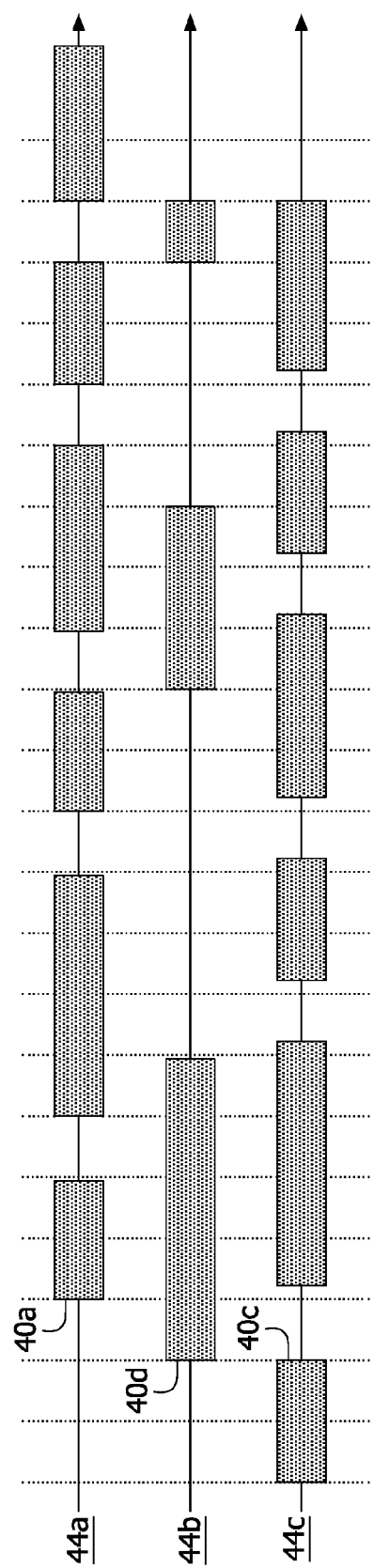
FIG. 9 shows the effect of duplication without DC Control

FIG. 9 shows the effect of duplication without DC Control.

Assuming that the original disc was created with a watermark as shown in FIG. 8, an illegal duplication would lead to the loss of the DC control information since that information is removed by the slicer in the bit detector and the subsequent decoding. Hence the DC content information is not easily accessible. When such information is re-encoded to be recorded on an illegal copy, the DC control unit of that recorder will take different decisions and thus the selection of groups of 17PP encoded bits will be different then in FIG. 8. Hence in FIG. 9 the central track 44b track has a different pattern of channel bits and thus of marks and lands. The marks 40, 40c, 40d no longer are properly aligned and do no longer form a diffractive element, thus destroying the diffractive nature of the grating.

The watermark is thus changed, which can be detected easily. This happens on a real optical on a much larger scale since the watermark input value is missing and completely different decisions will be taken, thus even more completely destroying the watermark of FIG. 8.

Also, for a recorder it is very difficult to establish the required spatial correlation between the watermark input value and the recording are where the channel bits will be recorded. On an LBR such correlation can be established by the original manufacturer of the legal optical discs.

Figure 10:
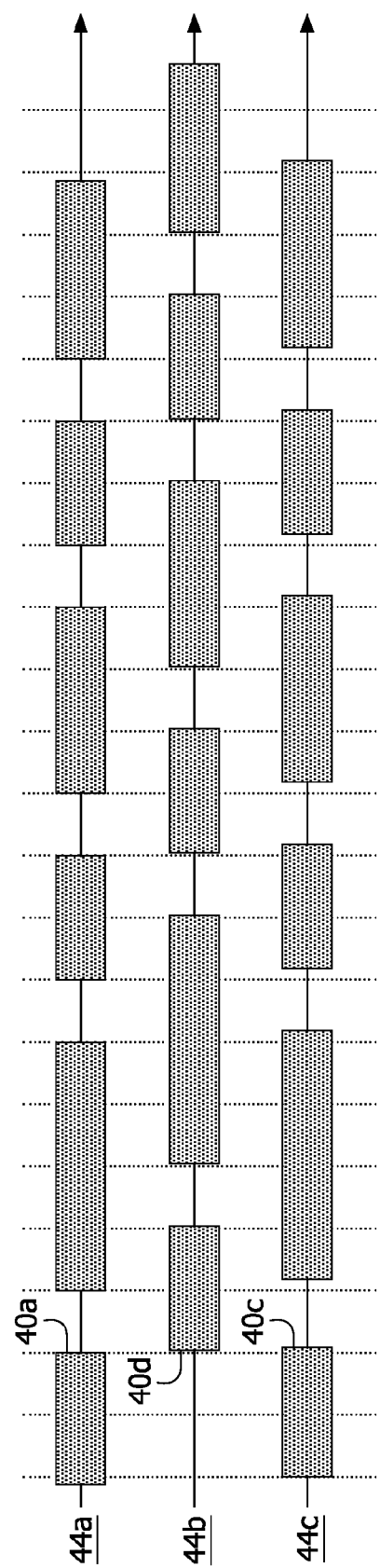
FIG. 10 shows the effect of duplication with DC Control.

FIG. 10 shows the effect of duplication by a bit by bit copy or by a re-encoding with maintained DC Control information.

Even when DC Control information can be preserved, the spatial location of the groups of marks and lands as recorded is very hard to control because of the mechanical tolerances of the mastering machines. In FIG. 10 the groups of marks and lands is the same as in FIG. 8 but a shift relative to each other has occurred.

The resulting pattern should be compared to the original situation in FIG. 8, where the second groups of marks and lands are aligned. A small shift as shown in FIG. 10 will destroy the carefully designed watermark.

The invention claimed is:

1. An optical disc comprising
a track; and
a plurality of marks located in the track representing a plurality of channel bits, the plurality of channel bits having a Digital Sum Value, the Digital Sum Value having a set point determined by a DC control, the DC control being limited within a DC Control range, characterized in that the optical disc further comprises:
diffractive elements in a limited contiguous area; and
a diffractive structure formed by the diffractive elements, each diffractive element being formed by an alignment of a plurality of marks across a plurality of radially at least partially adjacent sections of the track, where the set point is a modulated set point, diverting from a default set point in the limited contiguous area, the modulated set point being correlated to the alignment of the plurality of marks across the plurality of radially adjacent sections of the track.

2. The optical disc as claimed in claim 1, wherein the diffractive structure is a grating.

3. The optical disc as claimed in claim 1, wherein the diffractive elements extend perpendicular to a direction of the track.

4. The optical disc as claimed in claim 1, wherein the diffractive elements have a size such that a shift in a position of the marks equal to the size of the diffractive elements results in loss of the diffractive structure.

5. The optical disc as claimed in claim 1, wherein the diffractive structure is dimensioned to cause diffraction of a beam of light with a visual wavelength.

6. The optical disc as claimed in claim 5, wherein the visual wavelength is the optical disc recording or readout wavelength.

7. The optical disc as claimed in claim 5, wherein the diffractive structure forms a visual mark on the optical disc when illuminated.

8. The optical disc as claimed in claim 7, wherein the visual mark is a logo.

9. A method of producing an optical disc comprising
a track,
a plurality of marks located in the track representing a plurality of channel bits, the plurality of channel bits having a Digital Sum Value,
the Digital SUM Value having a set point determined by a DC control,
the DC control being limited within a DC Control range,
the method comprising the step of replicating the optical disc from a master,
characterized in that the optical disc further comprises:
diffractive elements in a limited contiguous area,
a diffractive structure formed by the diffractive elements,
each diffractive element being formed by an alignment of a plurality of marks across a plurality of radially at least partially adjacent sections of the track, where the Digital Sum Value is a modulated Digital Sum Value diverting from the set point in the limited contiguous area, the modulated Digital Sum Value being correlated to the alignment of the plurality of marks across the plurality of radially adjacent sections of the track.

10. The method of producing an optical disc as claimed in claim 9, where the diffractive structure is a grating.

11. The method of producing an optical disc as claimed in claim 9, where the diffractive elements extend perpendicular to a direction of the track.

12. The method as claimed in claim 9, where the diffractive elements have a size such that a shift in a position of the marks equal to the size of the diffractive elements results in loss of the diffractive structure.

13. The method as claimed in claim 9, where the diffractive structure is dimensioned to cause diffraction of a beam of light with a visual wavelength.

14. The method as claimed in claim 13, where the visual wavelength is the optical disc recording or readout wavelength.

15. The method as claimed in claim 13, where the diffractive structure forms a visual mark on the optical disc when illuminated.

16. The method as claimed in claim 15, where the visual mark is a logo.

* * * * *